(12) United States Patent
Wartmann

(10) Patent No.: US 9,645,380 B2
(45) Date of Patent: May 9, 2017

(54) HIGH APERTURE IMMERSION OBJECTIVE

(71) Applicant: Carl Zeiss Microscopy GmbH, Jena (DE)

(72) Inventor: Rolf Wartmann, Waake (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/426,527

(22) PCT Filed: Sep. 5, 2013

(86) PCT No.: PCT/EP2013/068325
§ 371 (c)(1),
(2) Date: Mar. 6, 2015

(87) PCT Pub. No.: WO2014/044537
PCT Pub. Date: Mar. 27, 2014

(65) Prior Publication Data
US 2015/0219887 A1 Aug. 6, 2015

(30) Foreign Application Priority Data

Sep. 21, 2012 (DE) .................. 10 2012 018 698

(51) Int. Cl.
*G02B 21/02* (2006.01)
*G02B 21/33* (2006.01)
(Continued)

(52) U.S. Cl.
CPC ............... *G02B 21/33* (2013.01); *G02B 1/02* (2013.01); *G02B 9/64* (2013.01); *G02B 21/02* (2013.01); *G02B 27/0025* (2013.01)

(58) Field of Classification Search
CPC ...... G02B 1/02; G02B 27/0025; G02B 21/02; G02B 9/64; G02B 21/33
(Continued)

(56) References Cited

U.S. PATENT DOCUMENTS 5,270,860 A 12/1993 Suzuki
7,268,953 B2 9/2007 Matthae et al.
(Continued)

FOREIGN PATENT DOCUMENTS

DE 102005027 423 A1 12/2006
DE 102009037 743 A1 2/2011
(Continued)

OTHER PUBLICATIONS

PCT International Search Report with English translation for PCT/EP2013/068325, mailed Dec. 17, 2013, 5 pgs.
(Continued)

*Primary Examiner* — Rahman Abdur
(74) *Attorney, Agent, or Firm* — Patterson Thuente Pedersen, P.A.

(57) ABSTRACT

The invention relates to a high aperture immersion objective particularly for uses in confocal microscopes where oil is the immersion fluid, which objective is composed of three lenses and/or subsystems comprising lens groups. An apochromatic correction in a range from 365 to 900 nm is achieved at high resolving numeric apertures of 1.3 to 1.4 and an object field from 0.4 to 0.625 mm by the specification of the optical components. Additionally, the immersion objective has sufficiently good transparency up to a wavelength of 340 nm.

11 Claims, 3 Drawing Sheets

(51) Int. Cl.
     *G02B 27/00*      (2006.01)
     *G02B 1/02*      (2006.01)
     *G02B 9/64*      (2006.01)

(58) Field of Classification Search
     USPC ............................... 359/656, 689, 657–661
     See application file for complete search history.

(56) References Cited

U.S. PATENT DOCUMENTS

2003/0053218 A1*   3/2003   Fujimoto ............... G02B 21/02
                                                                       359/656
2008/0285150 A1*  11/2008  Souma ................. G02B 15/161
                                                                       359/690

FOREIGN PATENT DOCUMENTS

DE      102009037743 A1 *  2/2011  ............. G02B 21/33
JP        2011 145713 A     7/2011

OTHER PUBLICATIONS

DE Search Report (5 pages) with English translation (5 pages) for DE 10 2012 018 698.3, mailed Oct. 4, 2012.
Notification of transmittal of Translation of the International Preliminary Report on Patentability for International Application No. PCT/EP2013/068325, mailed Apr. 2, 2015, 7 pages.

* cited by examiner

HIGH APERTURE IMMERSION OBJECTIVE

RELATED APPLICATIONS

The present application is a National Phase entry of PCT Application No. PCT/EP2013/068325, filed Sep. 5, 2013, which claims priority from DE Patent Application No. 10 2012 018 698.3, filed Sep. 21, 2012, said applications being hereby incorporated by reference herein in their entirety.

FIELD OF THE INVENTION

The invention relates to a high-aperture immersion objective, in particular for applications in confocal microscopy using oil as an immersion liquid, the objective being made up of three subsystems comprised of lenses and/or lens groups.

BACKGROUND OF THE INVENTION

The performance of a microscope depends primarily on the performance data and correction quality of the microscope objective being used.

In confocal microscopy, a great deal of value is placed on as perfect a parfocality as possible over an extremely large spectral range of 365 nm to 900 nm. This property being sought should if possible also be combined with the requirement of large objective fields, which is very important as well.

An apochromatically corrected microscope objective with a high aperture, a large object field and apochromatic correction in a wavelength range from ultraviolet to infrared is described in DE 102005027 423 A1, for example. However, water is used in this case as the immersion medium.

Known immersion objectives that use water as known solutions have the disadvantage that the numerical aperture is limited to about 1.2. However, higher numerical apertures and thereby a higher resolution capability require an oil immersion as a necessity.

In DE 102009037743 A1, a high-aperture immersion objective of an oil immersion for confocal applications in microscopy is described, the objective consisting of subsystems comprising three lenses and/or lens groups. In this solution, the disadvantage is that no parfocality is achieved in the UV range from 400 nm to 365 nm.

SUMMARY OF THE INVENTION

Starting with these disadvantages, the object of the invention is to further improve a high-aperture immersion objective with oil as the immersion liquid, in particular for confocal microscopy applications, in such a way that apochromatic correction in a range of 365 to 900 mm is achieved at high-resolution numerical apertures of 1.3 to 1.4 and an object field of 0.4 to 0.625 mm, and such that the immersion objective also possesses sufficiently good transparency up to a wavelength of 340 nm.

According to the invention, this object is achieved with an immersion objective of the type described above by way of the features of patent claim 1, wherein the immersion objective is made up of three optical subsystems. Advantageous embodiments are described in the dependent claims 2 through 11.

Starting from the object side, the first subsystem comprises a cemented element followed by two collecting lenses, wherein the cemented element comprises a flat surface facing the object side and consists of a collecting lens and a meniscus that is curved toward the object side, the meniscus having a negative refractive power, the second subsystem comprises three optical elements, the first optical element being designed as a collecting element and consisting of a collecting lens and a diverging lens, the second optical element consisting of a diverging triple cemented element with a collecting lens enclosed by two highly-refractive diverging lenses, and the third optical element being designed as a collecting element and consisting of a diverging lens and a collecting lens and the third subsystem comprises two meniscuses whose hollow surfaces face one another, wherein the first meniscus is designed as a cemented element with a collecting lens and a diverging lens and the second meniscus consists of a split cemented element comprising a diverging lens and a collecting lens.

An advantage is that the cemented member of the first subsystem has a weakly negative refractive power, with both collecting lenses being made of a fluoro-crown glass.

Another advantage is to make the collecting lens of the first optical member of the second subsystem out of fluorspar ($CaF_2$) or a fluoro-crown glass.

Also advantageous is to make the collecting lens of the second optical member of the second subsystem of fluorspar ($CaF_2$) or a fluoro-crown glass.

It is expedient for the diverging lenses of the second optical element of the second subsystem to be made of a highly-refractive lanthanum glass.

In another advantageous embodiment, the diverging lens of the third optical member of the second subsystem is made of a short flint glass.

Also advantageous is to make the collecting lens (S4) of the third optical member (G3) of the second subsystem (T2) of fluorspar ($CaF_2$) or a fluoro-crown glass.

It makes sense for the meniscuses of the third subsystem to have weak refractive forces, wherein the last collecting lens of the second meniscus has an Abbe number of less than 34.

The immersion objective according to the invention enables apochromatic correction in a range of 365 to 900 mm at high-resolution apertures of 1.3 to 1.4 and an object field of 0.4 to 0.625 mm. Moreover, the objective has good transparency up to a wavelength of 340 nm.

BRIEF DESCRIPTION OF THE DRAWINGS

The invention is explained in more detail below with the aid of exemplary embodiments. Shown are.

DETAILED DESCRIPTION

Figure 1:
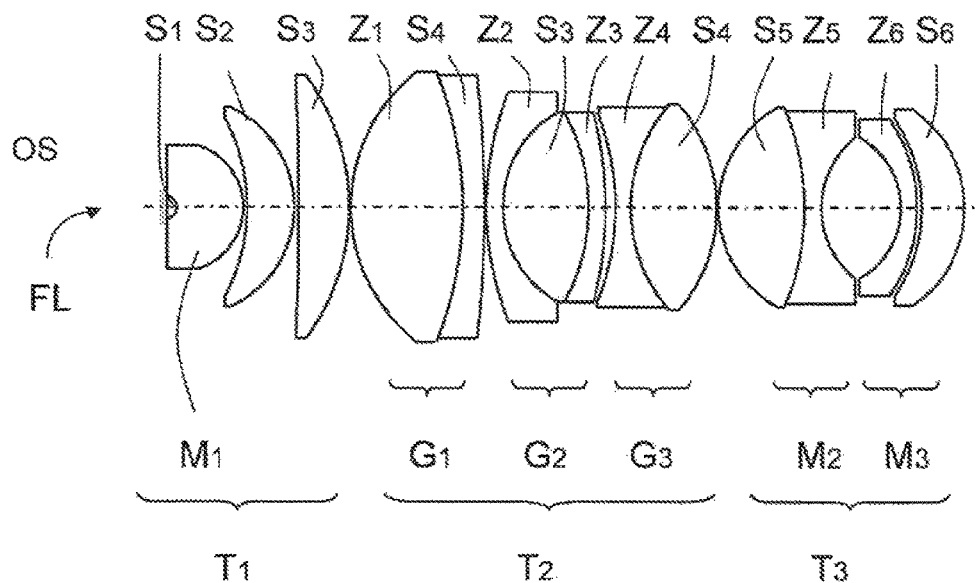
FIG. 1: A representation of the subsystems of the immersion object according to the invention according to a first exemplary embodiment
Figure 3:
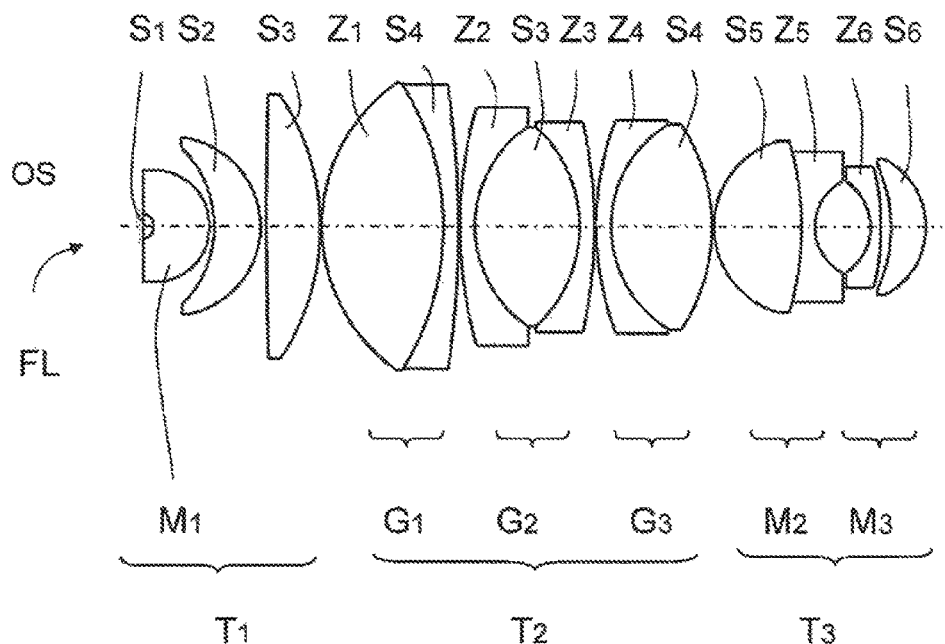
FIG. 3: A representation of the subsystems of the immersion objective according to the invention according to a second exemplary embodiment.
Figure 5:
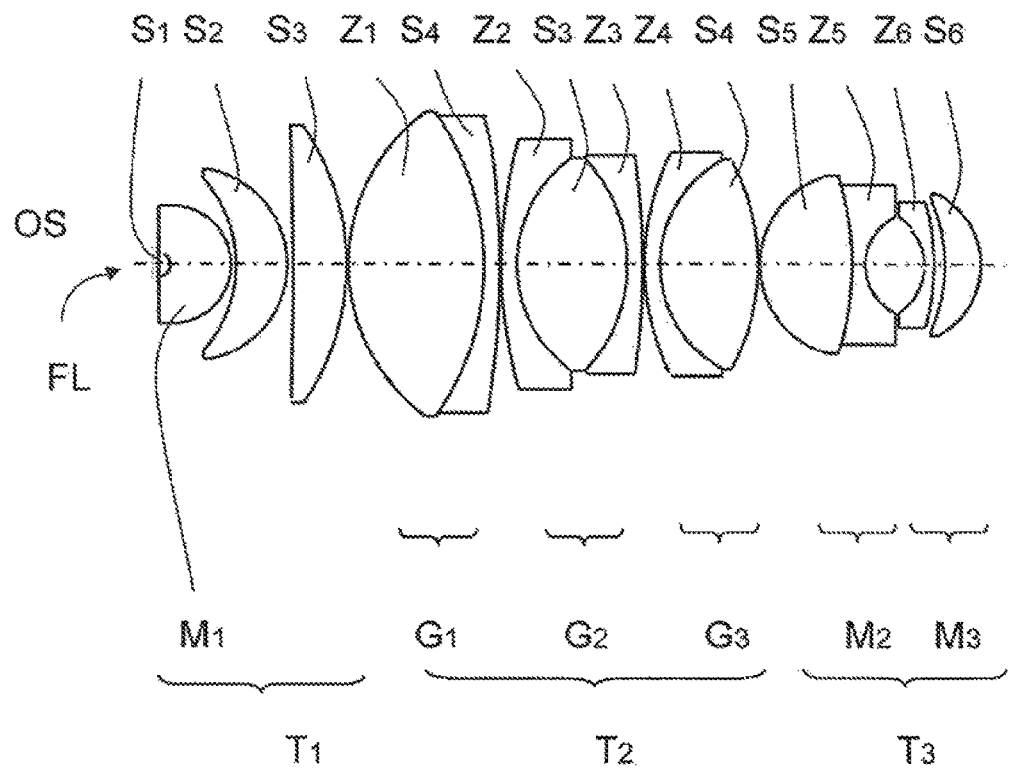
FIG. 5: A representation of the subsystems of the immersion objective according to the invention according to a third exemplary embodiment

FIGS. 1, 3 and 5 show the lens arrangements of the three optical subsystems of all three exemplary embodiments as seen from the object side, the subsystems identified by T1, T2 and T3.

The first subsystem T1 comprises a cemented element followed by two collecting lenses S2 and S3, wherein the cemented element comprises a flat surface facing the object side OS and consists of a collecting lens S1 and a meniscus M1 that is curved toward the object side OS, the meniscus having a negative refractive power.

The second subsystem T2 is characterized by three optical elements G1, G2 and G3, wherein the first optical element G1 is designed as a collecting element and is made of a collecting lens S4 and a diverging lens Z1.

The second optical element G2 is made of a diverging triple member comprising a collecting lens S3 enclosed by two highly-refracting diverging lenses Z2 and Z3. The third optical member G3 is designed as a collecting member and is made of a diverging lens Z4 and a collecting lens S4.

The third subsystem T3 is made of two meniscuses M2 and M3 whose hollow surfaces face one another, wherein the first meniscus M2 is designed as a cemented element with a collecting lens S5 and a diverging lens Z5. The second meniscus M3 is characterized by a diverging lens Z6 and a collecting lens S6 representing a split cemented element.

Figure 2:
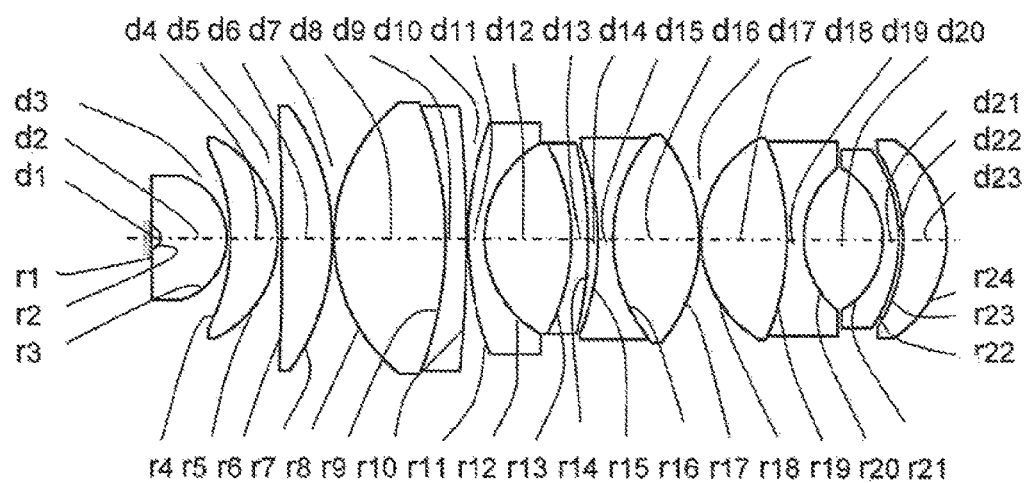
FIG. 2: A representation of the immersion objective according to the invention according to FIG. 1 with construction data references.
Figure 4:
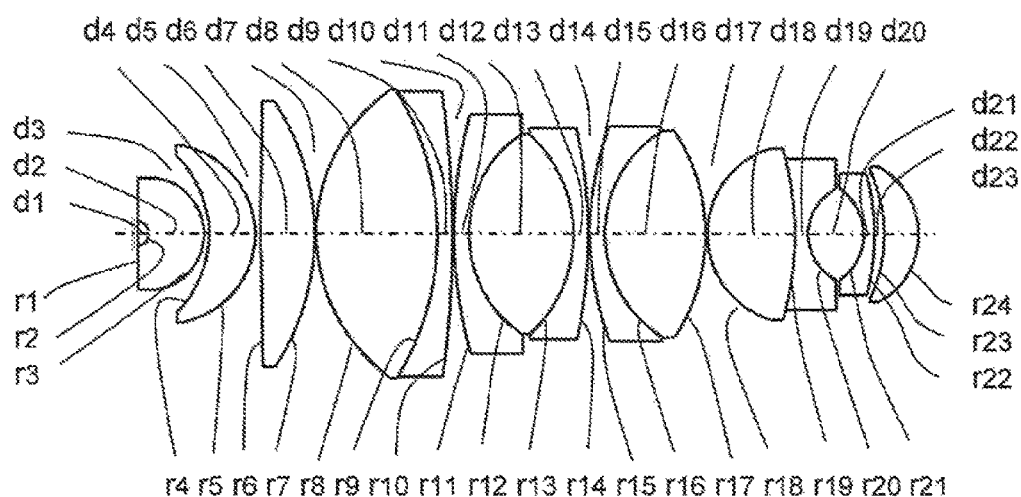
FIG. 4: A representation of the immersion objective according to the invention according to FIG. 3 with construction data references.
Figure 6:
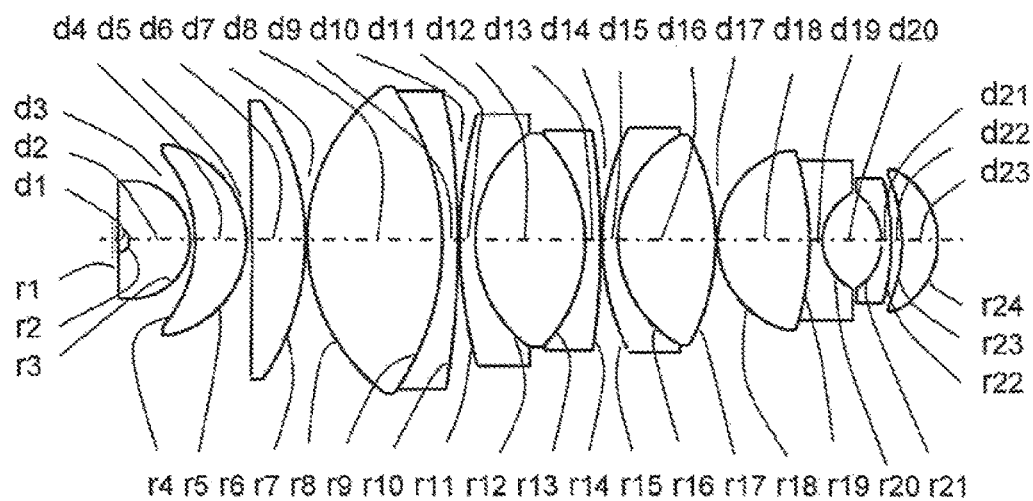
FIG. 6: A representation of the immersion objective according to the invention according to FIG. 5 with construction data references.

FIGS. 2, 4 and 6 show the lens arrangements of FIGS. 1, 3 and 5 with radii of curvature r1 to r24 and thicknesses, or air gaps, d1 to d23 of the arrangements according to FIGS. 1, 3 and 5.

For the first exemplary embodiment according to FIGS. 1 and 2, the following construction data result at a magnification of 40×, an image field diameter of 25 mm, a numerical aperture of 1.3, a working distance of 0.247 mm, a cover glass thickness of 0.17 mm, refractive indices $n_e$, Abbe numbers $v_e$ and oil immersion:

| Surface FL | Radius of curvature r1 to r24 (mm) | Thickness d1 to d24 (mm) | Refractive index $n_e$ | Abbe number $v_e$ |
|---|---|---|---|---|
| | | Oil immersion | | |
| 1 | Infinite | 0.570 | 1.54212 | 59.44 |
| 2 | −0.707 | 3.990 | 1.88815 | 40.52 |
| 3 | −3.868 | 0.228 | | |
| 4 | −11.546 | 2.810 | 1.59446 | 68.00 |
| 5 | −6.633 | 0.264 | | |
| 6 | −172.777 | 3.000 | 1.59446 | 68.00 |
| 7 | −13.433 | 0.100 | | |
| 8 | 10.366 | 6.670 | 1.43985 | 94.49 |
| 9 | −21.597 | 1.300 | 1.82017 | 46.37 |
| 10 | −68.294 | 0.100 | | |
| 11 | 18.566 | 1.000 | 1.88815 | 40.52 |
| 12 | 6.541 | 5.200 | 1.43985 | 94.49 |
| 13 | −11.799 | 1.000 | 1.73234 | 54.45 |
| 14 | −23.039 | 0.600 | | |
| 15 | −15.181 | 0.900 | 1.64132 | 42.20 |
| 16 | 9.442 | 5.150 | 1.43985 | 94.49 |
| 17 | −9.576 | 0.100 | | |
| 18 | 6.876 | 5.190 | 1.43985 | 94.49 |
| 19 | −14.962 | 1.000 | 1.56082 | 53.83 |
| 20 | 5.495 | 4.700 | | |
| 21 | −4.870 | 0.960 | 1.43985 | 94.49 |
| 22 | −9.442 | 0.278 | | |
| 23 | −9.576 | 2.620 | 1.65222 | 33.56 |
| 24 | −7.079 | | | |

When using the following construction data of a tubular lens unit not shown in more detail:

| Surface number | Radius of curvature r (mm) | Thickness d (mm) | Refractive index $n_e$ | Abbe number $v_e$ |
|---|---|---|---|---|
| | | 126.5 | | |
| 1 | 189.417 | 10.9 | 1.582 | 53.6 |
| 2 | −189.417 | 60 | | |
| 3 | infinite | 80 | 1.519 | 64.0 |
| 4 | infinite | 48.2 | | |
| 5 | intermediate image | | | |

For the second exemplary embodiment according to FIGS. 2 and 3, the following construction data result at a magnification of 63×, an image field diameter of 25 mm, a numerical aperture of 1.4, a working distance of 0.201 mm, a cover glass thickness of 0.17 mm, refractive indices $n_e$, Abbe numbers $v_e$ and oil immersion:

| Surface FL | Radius of curvature r1 to r24 (mm) | Thickness d1 to d23 (mm) | Refractive index $n_e$ | Abbe number $v_e$ |
|---|---|---|---|---|
| | | | Oil immersion | |
| 1 | infinite | 0.680 | 1.56605 | 60.55 |
| 2 | −0.792 | 3.414 | 1.88815 | 40.52 |
| 3 | −3.449 | 0.299 | | |
| 4 | −6.684 | 2.800 | 1.59446 | 68.00 |
| 5 | −5.495 | 0.349 | | |
| 6 | 286.521 | 3.280 | 1.59446 | 68.00 |
| 7 | −14.642 | 0.100 | | |
| 8 | 10.820 | 7.400 | 1.43985 | 94.49 |
| 9 | −16.549 | 0.900 | 1.56082 | 53.83 |
| 10 | −61.305 | 0.100 | | |
| 11 | 27.384 | 0.900 | 1.88815 | 40.52 |
| 12 | 7.285 | 6.460 | 1.43985 | 94.49 |
| 13 | −8.292 | 0.900 | 1.82017 | 46.37 |
| 14 | −29.430 | 0.100 | | |
| 15 | 18.553 | 0.900 | 1.64132 | 42.20 |
| 16 | 7.393 | 6.190 | 1.43985 | 94.49 |
| 17 | −11.380 | 0.100 | | |
| 18 | 5.465 | 5.410 | 1.43985 | 94.49 |
| 19 | −18.566 | 0.800 | 1.56082 | 53.83 |
| 20 | 3.163 | 3.400 | | |
| 21 | −3.400 | 0.640 | 1.71616 | 53.61 |
| 22 | −15.181 | 0.614 | | |
| 23 | −9.173 | 2.150 | 1.65222 | 33.56 |
| 24 | −4.665 | | | |

When using the following construction data of the tubular lens unit not shown in more detail:

| Surface number | Radius of curvature r (mm) | Thickness d (mm) | Refractive index ne | Abbe number ve |
|---|---|---|---|---|
| | | 126.5 | | |
| 1 | 189.417 | 10.9 | 1.582 | 53.6 |
| 2 | −189.417 | 60 | | |
| 3 | infinite | 80 | 1.519 | 64.0 |
| 4 | infinite | 48.2 | | |

-continued

| Surface number | Radius of curvature r (mm) | Thickness d (mm) | Refractive index ne | Abbe number ve |
|---|---|---|---|---|
| 5 | intermediate image plane | | | |

For the third exemplary embodiment according to FIGS. 5 and 6, the following construction data result at a magnification of 63×, an image field diameter of 25 mm, a numerical aperture of 1.4, a working distance of 0.173 mm, a cover glass thickness of 0.17 mm, refractive indices $n_e$, Abbe numbers $v_e$ and an oil immersion:

| Surface FL | Radius of curvature r1 to r24 (mm) | Thickness d1 to d23 (mm) | Refractive index $n_e$ | Abbe number $v_e$ |
|---|---|---|---|---|
| | | | Oil immersion | |
| 1 | Infinite | 0.665 | 1.56605 | 60.55 |
| 2 | −0.761 | 3.520 | 1.88815 | 40.52 |
| 3 | −3.449 | 0.297 | | |
| 4 | −7.606 | 3.000 | 1.53019 | 76.58 |
| 5 | −5.662 | 0.335 | | |
| 6 | −243.131 | 3.100 | 1.59446 | 68.00 |
| 7 | −14.331 | 0.100 | | |
| 8 | 11.060 | 7.900 | 1.43985 | 94.49 |
| 9 | −15.396 | 0.900 | 1.56082 | 53.83 |
| 10 | −53.861 | 0.100 | | |
| 11 | 26.994 | 0.900 | 1.88815 | 40.52 |
| 12 | 7.606 | 6.498 | 1.43985 | 94.49 |
| 13 | −9.005 | 0.900 | 1.82017 | 46.37 |
| 14 | −44.344 | 0.100 | | |
| 15 | 14.747 | 0.900 | 1.64132 | 42.20 |
| 16 | 6.979 | 5.700 | 1.43985 | 94.49 |
| 17 | −12.771 | 0.100 | | |
| 18 | 5.386 | 5.400 | 1.43985 | 94.49 |
| 19 | −17.151 | 0.750 | 1.56082 | 53.83 |
| 20 | 3.116 | 3.467 | | |
| 21 | −3.387 | 0.560 | 1.71616 | 53.61 |
| 22 | −13.820 | 0.628 | | |
| 23 | −9.576 | 2.100 | 1.65222 | 33.56 |
| 24 | −4.665 | | | |

When using the following construction data of the tubular lens unit not shown in more detail:

| Surface number | Radius of curvature r (mm) | Thickness d (mm) | Refractive index $n_e$ | Abbe number $v_e$ |
|---|---|---|---|---|
| | | 126.5 | | |
| 1 | 189.417 | 10.9 | 1.582 | 53.6 |
| 2 | −189.417 | 60 | | |
| 3 | Infinite | 80 | 1.519 | 64.0 |
| 4 | Infinite | 48.2 | | |
| 5 | intermediate image plane | | | |

The invention claimed is:

1. A high-aperture immersion objective, in particular for applications in confocal microscopy using oil as an immersion fluid, the objective being made up of three subsystems, wherein starting from the objective side, in order, and without any other intervening lenses or lens groups within or between the subsystems, the objective comprises:

a first subsystem consisting of a cemented element followed by two collecting lenses, wherein the cemented element comprises a flat surface facing the objective side and includes a collecting lens and a meniscus that is curved toward the object side, the meniscus having a negative refractive power;

a second subsystem consisting of three optical elements, wherein a first optical element of the second subsystem is a collecting element and includes a collecting lens and a diverging lens, a second optical element of the second subsystem includes a diverging triple cemented element with a collecting lens enclosed by two highly-refractive diverging lenses, and a third optical element of the second subsystem is a collecting element and includes a diverging lens and a collecting lens; and a third subsystem consisting of two meniscuses whose hollow surfaces face one another, wherein the first meniscus is a cemented element with a collecting lens and a diverging lens and the second meniscus includes a split cemented element comprising a diverging lens and a collecting lens.

2. The high-aperture immersion objective according to claim 1, wherein the cemented element of the first subsystem has a negative refractive power and both collecting lenses are made of a fluoro-crown glass.

3. The high-aperture immersion objective according to claim 1, wherein the collecting lens of the first optical element of the second subsystem is made of fluorspar (CaF2) or a fluoro-crown glass.

4. The high-aperture immersion objective according to claim 1, wherein the collecting lens of the second optical element of the second subsystem is made of fluorspar (CaF2) or a fluoro-crown glass.

5. The high-aperture immersion objective according to claim 1, wherein the diverging lenses of the second optical element of the second subsystem are made of a highly refractive Lanthanum glass.

6. The high-aperture immersion objective according to claim 1, wherein the diverging lens of the third optical element of the second subsystem is made of a short flint glass.

7. The high-aperture immersion objective according to claim 1, wherein the collecting lens of the third optical element of the second subsystem is made of fluorspar (CaF2) or a fluoro-crown glass.

8. The high-aperture immersion objective according to claim 1, wherein the meniscuses have refractive powers and the last collecting lens of the second meniscus has an Abbe number of less than 34.

9. The high-aperture immersion objective according to claim 1, having the following construction data, with radii of curvature r1 to r24 in mm, thicknesses or air gaps d1 to d23 in mm, refractive indices $n_e$, Abbe numbers $v_e$, and using an oil immersion, with an image field diameter of 25 mm, a magnification of 40×, a numerical aperture of 1.3, a working distance of 0.247 mm and a cover glass thickness of 0.17 mm:

| Surface FL | Radius of curvature r1 to r24 | Thickness d1 to d24 | Refractive index $n_e$ | Abbe number $v_e$ |
|---|---|---|---|---|
| | | | Oil immersion | |
| 1 | Infinite | 0.570 | 1.54212 | 59.44 |
| 2 | −0.707 | 3.990 | 1.88815 | 40.52 |
| 3 | −3.868 | 0.228 | | |
| 4 | −11.546 | 2.810 | 1.59446 | 68.00 |
| 5 | −6.633 | 0.264 | | |
| 6 | −172.777 | 3.000 | 1.59446 | 68.00 |
| 7 | −13.433 | 0.100 | | |
| 8 | 10.366 | 6.670 | 1.43985 | 94.49 |

-continued

| Surface FL | Radius of curvature r1 to r24 | Thickness d1 to d24 | Refractive index $n_e$ | Abbe number $v_e$ |
|---|---|---|---|---|
| 9 | −21.597 | 1.300 | 1.82017 | 46.37 |
| 10 | −68.294 | 0.100 | | |
| 11 | 18.566 | 1.000 | 1.88815 | 40.52 |
| 12 | 6.541 | 5.200 | 1.43985 | 94.49 |
| 13 | −11.799 | 1.000 | 1.73234 | 54.45 |
| 14 | −23.039 | 0.600 | | |
| 15 | −15.181 | 0.900 | 1.64132 | 42.20 |
| 16 | 9.442 | 5.150 | 1.43985 | 94.49 |
| 17 | −9.576 | 0.100 | | |
| 18 | 6.876 | 5.190 | 1.43985 | 94.49 |
| 19 | −14.962 | 1.000 | 1.56082 | 53.83 |
| 20 | 5.495 | 4.700 | | |
| 21 | −4.870 | 0.960 | 1.43985 | 94.49 |
| 22 | −9.442 | 0.278 | | |
| 23 | −9.576 | 2.620 | 1.65222 | 33.56. |
| 24 | −7.079 | | | |

10. The high-aperture immersion objective according to claim 1, having the following construction data, with radii of curvature r1 to r24 in mm, thicknesses or air gaps d1 to d23 in mm, refractive indices $n_e$, Abbe numbers $v_e$, and using an oil immersion, with an image field diameter of 25 mm, a magnification of 63×, a numerical aperture of 1.4, a working distance of 0.201 mm and a cover glass thickness of 0.17 mm:

| Surface FL | Radius of curvature r1 to r24 | Thickness d1 to d23 | Refractive index $n_e$ | Abbe number $v_e$ |
|---|---|---|---|---|
| | | Oil immersion | | |
| 1 | Infinite | 0.680 | 1.56605 | 60.55 |
| 2 | −0.792 | 3.414 | 1.88815 | 40.52 |
| 3 | −3.449 | 0.299 | | |
| 4 | −6.684 | 2.800 | 1.59446 | 68.00 |
| 5 | −5.495 | 0.349 | | |
| 6 | 286.521 | 3.280 | 1.59446 | 68.00 |
| 7 | −14.642 | 0.100 | | |
| 8 | 10.820 | 7.400 | 1.43985 | 94.49 |
| 9 | −16.549 | 0.900 | 1.56082 | 53.83 |
| 10 | −61.305 | 0.100 | | |
| 11 | 27.384 | 0.900 | 1.88815 | 40.52 |
| 12 | 7.285 | 6.460 | 1.43985 | 94.49 |
| 13 | −8.292 | 0.900 | 1.82017 | 46.37 |
| 14 | −29.430 | 0.100 | | |
| 15 | 18.553 | 0.900 | 1.64132 | 42.20 |
| 16 | 7.393 | 6.190 | 1.43985 | 94.49 |
| 17 | −11.380 | 0.100 | | |
| 18 | 5.465 | 5.410 | 1.43985 | 94.49 |
| 19 | −18.566 | 0.800 | 1.56082 | 53.83 |
| 20 | 3.163 | 3.400 | | |
| 21 | −3.400 | 0.640 | 1.71616 | 53.61 |
| 22 | −15.181 | 0.614 | | |
| 23 | −9.173 | 2.150 | 1.65222 | 33.56. |
| 24 | −4.665 | | | |

11. The high-aperture immersion objective according to claim 1, having the following construction data, with radii of curvature r1 to r24 in mm, thicknesses or air gaps d1 to d23 in mm, refractive indices $n_e$, Abbe numbers $v_e$, and using an oil immersion, with an image field diameter of 25 mm, a magnification of 63×, a numerical aperture of 1.4, a working distance of 0.173 mm and a cover glass thickness of 0.17 mm:

| Surface FL | Radius of curvature r1 to r24 | Thickness d1 to d23 | Refractive index $n_e$ | Abbe number $v_e$ |
|---|---|---|---|---|
| | | Oil immersion | | |
| 1 | infinite | 0.665 | 1.56605 | 60.55 |
| 2 | −0.761 | 3.520 | 1.88815 | 40.52 |
| 3 | −3.449 | 0.297 | | |
| 4 | −7.606 | 3.000 | 1.53019 | 76.58 |
| 5 | −5.662 | 0.335 | | |
| 6 | −243.131 | 3.100 | 1.59446 | 68.00 |
| 7 | −14.331 | 0.100 | | |
| 8 | 11.060 | 7.900 | 1.43985 | 94.49 |
| 9 | −15.396 | 0.900 | 1.56082 | 53.83 |
| 10 | −53.861 | 0.100 | | |
| 11 | 26.994 | 0.900 | 1.88815 | 40.52 |
| 12 | 7.606 | 6.498 | 1.43985 | 94.49 |
| 13 | −9.005 | 0.900 | 1.82017 | 46.37 |
| 14 | −44.344 | 0.100 | | |
| 15 | 14.747 | 0.900 | 1.64132 | 42.20 |
| 16 | 6.979 | 5.700 | 1.43985 | 94.49 |
| 17 | −12.771 | 0.100 | | |
| 18 | 5.386 | 5.400 | 1.43985 | 94.49 |
| 19 | −17.151 | 0.750 | 1.56082 | 53.83 |
| 20 | 3.116 | 3.467 | | |
| 21 | −3.387 | 0.560 | 1.71616 | 53.61 |
| 22 | −13.820 | 0.628 | | |
| 23 | −9.576 | 2.100 | 1.65222 | 33.56 |
| 24 | −4.665 | | | |

When using the following construction data of the tubular lens unit:

| Surface | Radius of curvature | Thickness | Refractive index | Abbe number |
|---|---|---|---|---|
| | | 126.5 | | |
| 1 | 189.417 | 10.9 | 1.582 | 53.6 |
| 2 | −189.417 | 60 | | |
| 3 | Infinite | 80 | 1.519 | 64.0. |
| 4 | Infinite | 48.2 | | |
| 5 | intermediate image plane | | | |

* * * * *